United States Patent
Casamajou

(10) Patent No.: US 8,571,156 B2
(45) Date of Patent: Oct. 29, 2013

(54) RECEIVER APPARATUS

(75) Inventor: Yann Casamajou, Argences (FR)

(73) Assignee: NXP, B.V., Eindhoven (NL)

( * ) Notice: Subject to any disclaimer, the term of this patent is extended or adjusted under 35 U.S.C. 154(b) by 880 days.

(21) Appl. No.: 12/599,697

(22) PCT Filed: May 27, 2008

(86) PCT No.: PCT/IB2008/052075
§ 371 (c)(1),
(2), (4) Date: Nov. 11, 2009

(87) PCT Pub. No.: WO2008/146242
PCT Pub. Date: Dec. 4, 2008

(65) Prior Publication Data
US 2010/0303161 A1   Dec. 2, 2010

(30) Foreign Application Priority Data
May 30, 2007 (EP) .................................. 07290676

(51) Int. Cl.
*H04B 1/10* (2006.01)

(52) U.S. Cl.
USPC ........................................................ 375/350

(58) Field of Classification Search
USPC ............. 375/316, 346, 350, 259, 260
See application file for complete search history.

(56) References Cited

U.S. PATENT DOCUMENTS

| 6,636,727 B2 | 10/2003 | Muschallik et al. |
| 7,085,315 B1 | 8/2006 | Kelton |
| 7,961,806 B2 * | 6/2011 | Lin et al. .................. 375/262 |
| 2005/0129135 A1 | 6/2005 | Kim |
| 2005/0215193 A1 | 9/2005 | Kummetz |
| 2007/0263857 A1 * | 11/2007 | Sharon et al. ............ 379/416 |

FOREIGN PATENT DOCUMENTS

| EP | 0838928 A2 | 4/1998 |
| EP | 1301003 A1 | 4/2003 |

OTHER PUBLICATIONS

Tsai, et al; "Frequency-Domain Interpolation-Based Channel Estimation in Pilot-Aided OFDM Systems"; IEEE 59th Vehicular Technology Conference—VTC 2004, Milan, Italy; May 17-19, 2004; vol. 1; pp. 420-424.

International Search Report for Application No. PCT/IB2008/052075 (Apr. 20, 2009) DLS.

* cited by examiner

*Primary Examiner* — Kevin M Burd

(57) ABSTRACT

A receiver apparatus (1) for receiving a signal over a fading channel comprises a frequency domain interpolation unit (16) with a filter unit (10), a power comparison unit (20), and a processing unit (21). The filter unit (10) comprises a first filter element (11), which is a reference filter, and a second filter element (12). The first filter element (11) is arranged as large-band filter. The power comparison unit (20) compares the power of the signal filtered with said second filter element (12) with the power of the signal filtered with said first filter element (11). The processing unit (21) determines an appropriate filter length for a third filter element (13) of the filter unit (10) on the basis of this comparison. Thereby, a trade-off is made between an additional power received due to a long echo and an additional Gaussian noise power. The signal filtered with the third filter element (13) is sent to a signal processing unit (22) for further signal processing and then output at said output (4) of the receiver apparatus (1).

10 Claims, 1 Drawing Sheet

RECEIVER APPARATUS

FIELD

The present invention relates to a receiver apparatus for receiving a signal over a fading channel, to a wireless network comprising such a receiver apparatus and to a method for transmission of data. More particularly, the present invention relates to a wireless network on the basis of a modulation technique such as orthogonal frequency division multiplexing (OFDM) as used, for example, in DVB-T or DVB-H.

BACKGROUND

EP 0 838 928 A2 describes an apparatus for receiving digital signals transmitted over a transmissive channel as a sequence of OFDM multi-carrier symbols. Thereby, the transmitted signal is of the type including a reference symbol transmitted at each predetermined group of OFDM symbols. The apparatus known comprises means for generating an estimate of a channel transfer function by dividing the demodulated elementary components of a previously received OFDM symbol by the respective estimates of the same previously transmitted symbol, as obtained after equalization, forward error correction, re-encoding and re-mapping. Further, the initial estimate of the channel transfer function is obtained by dividing the demodulated components of a predetermined OFDM reference symbol by the respective components of the same transmitted symbol as stored in the receiver. The known apparatus comprises a frequency-domain filter for filtering the estimates of the channel transfer function with an equivalent "bandwidth" that is greater than the time duration of the guard interval but smaller than the time distance between the periodical repetitions of the channel impulse response due to sub-sampling in the frequency domain.

The apparatus known from EP 0 838 928 A2 has the disadvantage of a complex implementation having a very long feedback loop through the Viterbi decoder into the channel estimation. Further, the quality of the signal received may degrade for channels with fast changing impulse responses.

OBJECT AND SUMMARY

It is an object of the invention to provide a receiver apparatus, a wireless network and method for transmission of data with an improved performance, especially with an improved adaption to a channel with a changing impulse response.

This object is solved by a receiver apparatus, a wireless network, and a method. Advantageous developments are mentioned in the dependent claims.

It is noted that the first filter element, the second filter element, and the third filter element are not necessarily implemented as distinct elements. For example, a filter unit may provide a general filter element. This general filter element can then perform the operation of the first filter element, the second filter element, and the third filter element, respectively.

It is advantageous that the power comparison unit calculates a power ratio as a fraction value having a numerator which is the power of the signal filtered with the second filter and a denominator which is the power of the signal filtered with the first filter, and that the processing unit determines the appropriate filter length for the third filter element on the basis of this power ratio. This has the advantage that the determination of the appropriate filter length can be made with reference to a relative value, which measures the strength of the signal filtered with the second filter with reference to the strength of the signal filtered with the first filter.

Further, it is advantageous that the processing unit varies the filter length of the second filter element so that the power ratio is at least nearly 100% so as to provide a good reception in terms of received signal power versus received signal noise. In case that the filter length of the second filter is at most equal to the filter length of the first filter, the power ratio is at most 100%. In this case, the processing unit can vary the filter length of the second filter element so as to achieve the appropriate power ratio.

Thereby, it is further advantageous that a large amount of signal power is received, while the received power of noise is relatively small. Hence, it is advantageous that the shortest filter length of the second filter element is used for which the power ratio is at least nearly 100%.

It is advantageous that the processing unit varies the filter length of the second filter element so as to detect at least a long echo of the signal as long as the power of this long echo is superior to a certain threshold. This enables reception of a large amount of the signal power that can be utilized.

Thereby, a trade-off must be made between reception of an additional long echo of the signal and an additional power of a noise added due to the increase in filter length. Therefore, it is advantageous that the processing unit determines the appropriate filter length on the basis of the power of the long echo and an additional power of a noise, especially a Gaussian noise, added due to the increase in filter length so as to receive the long echo.

It is advantageous that the first filter element is a large-band filter. This has the advantage that reference can be made to the total amount of signal power.

It is also advantageous that the first filter element is a narrow-band filter, which is used as a reference. This has the advantage that reference can be made to the power of the main part of the signal. Hence, it is possible to reduce on-the fly the filter length of the third filter, which is the bandwidth of the equalization filter, by detecting the absence of long echoes.

These and other aspects of the invention will be apparent from and elucidated with reference to the embodiments described hereinafter.

BRIEF DESCRIPTION OF THE DRAWINGS

The present invention will become readily understood from the following description of preferred embodiments thereof made with reference to the accompanying drawing, in which.

DESCRIPTION OF EMBODIMENTS

Figure 1:
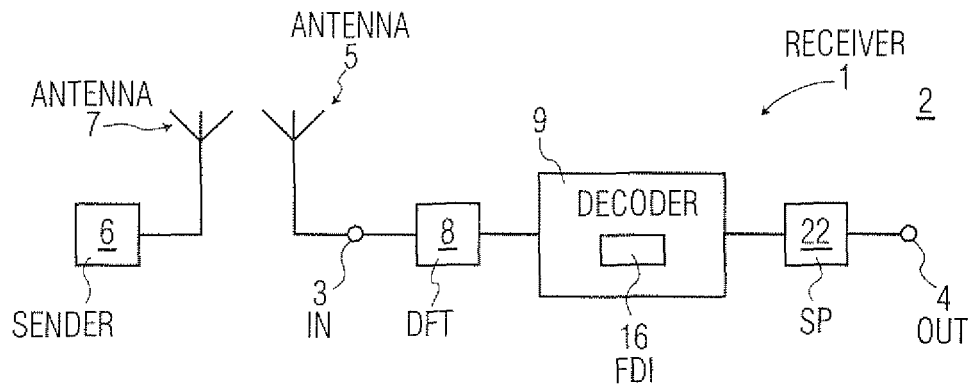
FIG. 1 shows a schematic view of a receiver apparatus of a wireless network according to an embodiment of the present invention.

FIG. 1 shows a receiver apparatus 1 of a wireless network 2. The receiver apparatus 1 comprises an input 3 and an output 4. The input 3 is connected with an antenna 5. The wireless network 2 also comprises a sender 6 with an antenna 7. The wireless network 2 can be based on a standard with a modulation scheme such as orthogonal frequency division multiplexing (OFDM). In such a standard, the signal comprises pilots placed at certain frequencies that allow getting a right estimation of the channel in order to deal easily with the problem of echoes in a mobile environment. In DVB-T like standards, some pilots are only active during some symbols.

These pilots are arranged as scattered pilots, which are used for channel estimation and equalization. But the receiver apparatus 1 and the wireless network 2 of the invention can also be used in other situations, especially with other modulation schemes.

The receiver apparatus 1 comprises a discrete Fourier transform (DFT) unit 8, a decoder unit 9, and a signal processing unit 22. The decoder unit 9 comprises a frequency domain interpolation unit 16 so as to measure the power with different interpolation filters during a frequency domain interpolation.

To get an estimation of the channel for every subcarrier of every OFDM symbol, the scattered pilots are interpolated both in time and in frequency domains. In the frequency domain, a strategy to reject a maximum possible noise is to use the narrowest possible interpolation filter regarding the channel impulse response. But, in a mobile environment, the bandwidth of the filter may not be chosen large enough to equalize a long echo that may appear suddenly.

The frequency domain interpolation unit 16 is described in further detail with reference to FIG. 2.

Figure 2:
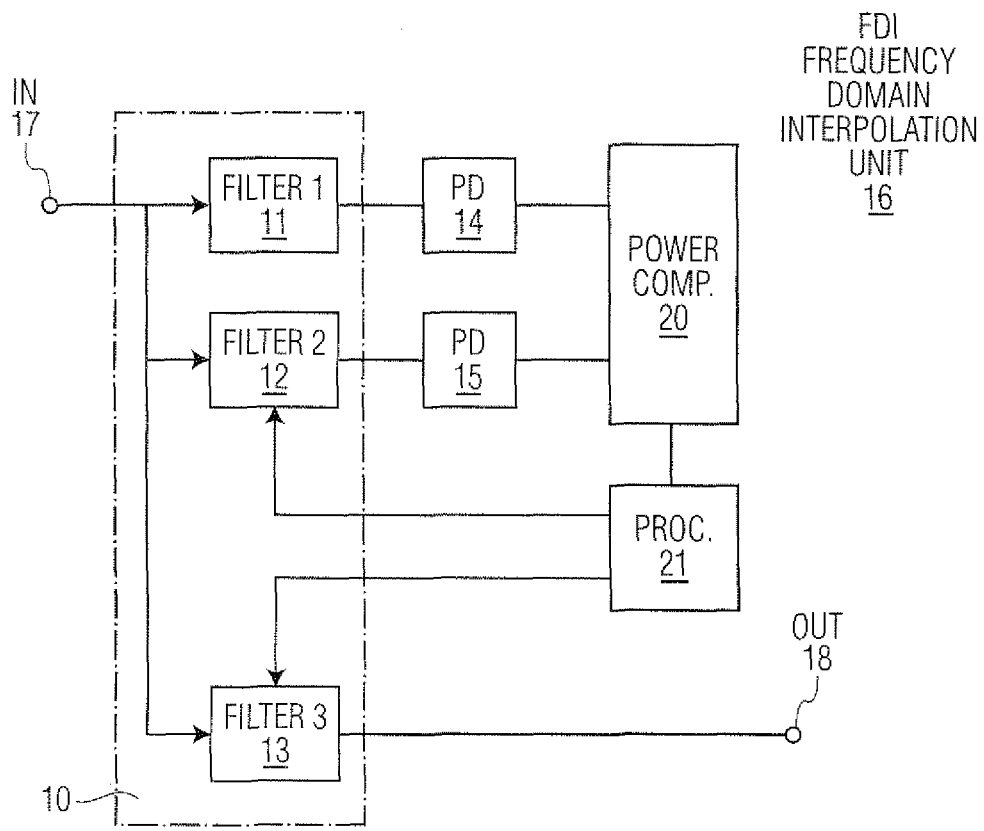
FIG. 2 shows a block diagram of a frequency domain interpolation unit of the receiver apparatus shown in FIG. 1.

FIG. 2 shows a schematic block diagram of the frequency domain interpolation unit 16. The frequency domain interpolation unit 16 comprises an input 17 so as to input the estimates for the pilot positions after the DFT. The frequency domain interpolation unit 16 outputs the interpolated estimation for the channel for every symbol, especially the data symbols, with respect to the frequency domain.

A Gaussian noise model may be used to describe the noise which is added to the signal during the transmission from sender 6 to receiver apparatus 1. Such a Gaussian noise adds a specific noise energy to the signal which depends on a filter length used by a filter unit 10 of the receiver apparatus 1. The filter unit 10 comprises a first filter element 11, a second filter element 12, and a third filter element 13. In an embodiment, the filter length of the first filter element 11 is fixed or at least set to a fixed value for a relatively long time. Further, the filter length of the first filter element 11 is selected so as to make the first filter element 11 a broad-band filter. The filter length of the second filter element 12 is variable. Further, it is advantageous that the filter length of the second filter element 12 is smaller or at most equal to the filter length of the first filter element 11, because the filter length of the first filter element 11 is relatively long.

It is noted that the filter length of the second filter element 12 may also be variable so that the fixed filter length of the first filter elements 11 is within the range of the filter length of second filter element 12. In such a case, it is advantageous that the filter length of the first filter element 11 is not too long. As a further alternative, the filter length of the first filter element 11 may be chosen to be relatively short. The first filter element 11 is then arranged as a narrow-band filter. In this case, it is advantageous that the filter length of the second filter element 12 is equal or greater than the length of the first filter element 11.

In the following, it is assumed that the first filter element 11 is arranged as a broad-band filter and that the filter length of the second filter element 12 is equal or smaller than the length of first filter element 11. The other cases can be derived accordingly.

Among the disturbances possibly encountered in terrestrial channels, Gaussian noise is usually one of the most limiting disturbances, impacting every functioning limit. As the impact of Gaussian noise is particularly critical in the equalization process, one way to decrease the amount of noise is simply to reduce the bandwidth of the interpolation filter. This can increase the performance, especially when no long echo is detected. Then, a narrower bandwidth can be used and gives much better performance in terms of noise rejection. But, when a long echo occurs, a relatively fast detection of the power of the new long echo is necessary. Otherwise, when using a filter with a reduced bandwidth to reject more noise, the equalizer may not be able to equalize and a lot of the equalized data is degraded.

The receiver apparatus 1, according to an embodiment, enables a fast detection of at least a new long echo so that the appropriate filter length for signal reception, especially equalization, can be determined and used as a filter length of the third filter element 13, which is used for filtering the signal sent to output 4.

The filter unit 10 processes the signal from input 3 with the filter elements 11, 12, and 13. This processing may be performed in parallel or in serial according to the processing speed of the filter unit 10. In the embodiment shown in FIG. 1, parallel processing is shown. The signal filtered with the first filter element 11 is sent through a power determination unit 14, which measures the power of the filtered signal. The result of this power measurement is then sent to a power comparison unit 20. The signal is also filtered with the second filter element 12, and the power of this filtered signal is determined in a power determination unit 15. The power determined by the power determination unit 15 is also sent to the power comparison unit 20. The power comparison unit 20 compares the power of the signal filtered with the first filter element 11, which is received from the power determination unit 14, with a signal power of the signal filtered with the second filter element 12, which is received from the power determination unit 15. For example, the power comparison unit 20 calculates a power ratio as a fraction having a numerator which is the power of the signal filtered with the second filter element 12 and a denominator which is the power of the signal filtered with the first filter element 11. The power comparison unit 20 is connected with a processing unit 21. The processing unit 21 determines an appropriate filter length for the third filter element 13 on the basis of the comparison made by the power comparison unit 20, especially on the basis of the determined power ratio. The processing unit 21 may also vary the filter length of the second filter element 12 so as to determine the appropriate filter length for the third filter element 13. For example, the processing unit 21 can vary the filter length of the second filter element 12 so that the power ratio determined by the power comparison unit 20 is at least nearly 100%.

The processing unit 21 can also vary the filter length of the second filter element 12 and determine, on the basis of the power ratio determined by the power comparison unit 20, the position of a long echo of the signal received. The processing unit 21 can include such a long echo, when the power of the long echo is superior to a certain threshold.

It is noted that the selection of the appropriate filter length for the third filter element 13 is a trade-off between the additional signal power and the additional noise power received, when the filter length is increased. Hence, it is advantageous that the power comparison unit 20 switches back to a larger filter length to avoid degrading the equalized data, when the determination of the power determination unit 14 indicates the need to switch back to a large-band interpolation filter. This is a possible way to secure the reduction of the interpolation filter's bandwidth to reject Gaussian noise.

If the first filter element 11 is a large-band filter and the filter length of the second filter element 12 is smaller or, at most equal, to the filter length of the first filter element 11, the power determined by the power determination unit 14, which is the power of the signal filtered with the first filter element 11, is always greater than the power output by the power determination unit 15, because it includes more Gaussian noise. However, if the ratio between the output of the power determination unit 15 and the output of the power determination unit 14 is superior to a certain threshold, then it shows that this excessive amount of power attenuated by the used narrow-band filter of the second filter element 12 is due to misequalization of the echo.

It is noted that the receiver apparatus can also be applied using a narrow-band filter for the first filter element 11 as a reference, to detect a possibility to reduce on the fly the bandwidth of the third filter element 13 by detecting the absence of long echoes.

When the appropriate filter length for the third filter element 13 is determined and set in the third filter element 13, the received signal is filtered by the third filter element 13 and sent to the output 18.

The decoder unit 9 decodes the signal and outputs the decoded signal to the signal processing unit 22 for further signal processing. After further signal processing, a signal is output at the output 4 of the receiver apparatus 1.

Although an exemplary embodiment of the invention has been disclosed, it will be apparent to those skilled in the art that various changes and modifications can be made which will achieve some of the advantages of the invention without departing from the spirit and scope of the invention. Such modifications to the inventive concept are intended to be covered by the appended claims in which the reference signs shall not be construed as limiting the scope of the invention. Further, in the description and the appended claims the meaning of "comprising" is not to be understood as excluding other elements or steps. Further, "a" or "an" does not exclude a plurality, and a single processor or other unit may fulfill the functions of several means recited in the claims.

The invention claimed is:

1. A receiver apparatus configured for receiving a signal over a fading channel, wherein symbols are modulated onto subcarrier frequency channels and pilots are placed at some of the subcarrier frequency channels, the receiver apparatus comprising:
   a frequency domain interpolation unit that is configured to interpolate the pilots at the subcarrier frequency channels and further comprises:
   a power comparison unit,
   a first filter element configured to filter a first signal,
   a second filter element configured to filter a second signal, and
   a third filter element, wherein a length of said second filter element is variable with respect to a length of said first filter element, said power comparison unit is configured to compare a signal power of the first signal with a signal power of the second signal, and
   a processing unit is configured to determine an appropriate filter length for said third filter element based on an output of said power comparison unit and said third filter element is configured to filter the received signal with a filter length set to said determined filter length.

2. The receiver apparatus according to claim 1, wherein said power comparison unit is configured to calculate a power ratio as a fraction value having a numerator which is said power of the second signal and a denominator which is the power of the first signal, and determine said appropriate filter length for said third filter element based on the calculated power ratio.

3. The receiver apparatus according to claim 2, wherein said processing unit is configured to vary said filter length of said second filter element so that the calculated power ratio is at least approximately 100%.

4. The receiver apparatus according to claim 3, wherein said processing unit is configured to determine said appropriate filter length of said third filter element as the shortest filter length of said second filter element for which said power ratio is nearly 100%.

5. The receiver apparatus according to claim 2, wherein said processing unit is configured to vary said filter length of said second filter element so as to detect at least a long echo of the signal, and determine said appropriate filter length so that the long echo of the signal is within said appropriate filter length, when a power of the long echo is superior to a threshold.

6. The receiver apparatus according to claim 5, wherein said processing unit is configured to determine said appropriate filter length based on the power of the long echo and an additional power of a Gaussian noise added due to the increase in filter length so as to receive the long echo.

7. A wireless network comprising a sender and the receiver apparatus according to claim 1, wherein said sender sends a signal comprising transmitted symbols modulated onto the subcarrier frequency channels over the fading channel to said receiver apparatus.

8. A method for transmission of data from a sender to a receiver apparatus, the method comprising:
   modulating symbols onto subcarrier frequency channels;
   placing pilots at some of the subcarrier frequency channels;
   filtering a received signal comprising pilots of the subcarrier frequency channels with a first filter length in a frequency domain to produce a first signal;
   filtering the received signal with at least a second filter length in said frequency domain to produce a second signal;
   comparing a signal power of the first signal and a signal power of the second signal;
   determining an appropriate filter length for filtering the received signal based on the comparison; and
   filtering the received signal with an appropriate filter length in said frequency domain.

9. The method according to claim 8, wherein the filter length is a large-band filter length.

10. The method according to claim 8, wherein the filter length is a narrow-band filter length.

* * * * *